July 25, 1933.  W. G. ADAM ET AL  1,919,707

PRODUCTION OF SULPHATE OF AMMONIA

Filed March 13, 1930

Patented July 25, 1933

1,919,707

UNITED STATES PATENT OFFICE

WILLIAM GORDON ADAM, OF LOUGHTON, AND DONALD GEORGE MURDOCH, OF CRICKLEWOOD, LONDON, ENGLAND, ASSIGNORS TO THE GAS LIGHT & COKE COMPANY, OF LONDON, ENGLAND, A BRITISH COMPANY

PRODUCTION OF SULPHATE OF AMMONIA

Application filed March 13, 1930, Serial No. 435,592, and in Great Britain March 20, 1929.

This invention relates to the crystallization of sulphate of ammonia and has for its object the production of crystals of such size and shape as to show little or no tendency to cake in bulk on standing.

Previous investigation has shown that the caking of neutral sulphate of ammonia is mainly due to loss of moisture but it has also been considered that the size and form of the crystal might have a bearing on the problem. It has been ascertained that caking is caused by small crystals being formed when the moisture is evaporated, these crystals binding together the large crystals around the points of contact. It appeared therefore that if the area of intercrystalline contact could be reduced this would diminish the tendency to cake. The smaller the total area of contact between the crystals in bulk, the larger will be the free space or voids.

It has been found in fact that the proportion of voids is one of the controlling factors affecting the tendency of a crystalline product to cake under certain conditions and that it is desirable to increase, as far as possible, the proportion of voids in the mass. See the Chemical Trade Journal and Chemical Engineer January 6th 1928 page 3.

The proportion of voids depends not so much upon the size of the individual crystals in the mass as upon their shape. It has been found that by careful control of conditions of crystallization, to ensure formation and growth at the desired rate, crystals of modified form may be obtained by controlling and altering the composition of the liquor from which they are produced.

It is thus possible to produce crystals of elongated form which exhibit a high percentage of voids when in bulk. One method of producing sulphate of ammonia showing little or no tendency to cake on standing, according to the present invention, consists in passing ammoniacal gas into hot sulphuric acid whose temperature is maintained within narrow limits at or about the boiling point and containing a small proportion of a metallic salt conducive to the formation of crystals of elongated form. Preferably an iron salt is employed and a small proportion calculated to give rise to robust crystals of elongated form preferably having end development is employed so as to yield sulphate of ammonia in a form exhibiting a high proportion of voids in the mass. The sulphuric acid employed may initially contain the necessary metallic salt in which case the amount is adjusted, if necessary, to that required for the production of robust pointed elongated crystals, for instance by dilution with sulphuric acid free from any such metallic salt.

The invention includes broadly the method of producing sulphate of ammonia showing little or no tendency to cake on standing which consists in effecting crystallization from an aqueous solution under controlled conditions calculated to give rise to robust elongated crystals exhibiting a high proportion of intercrystalline voids in bulk. The invention also includes the method of producing sulphate of ammonia in the form of robust crystals of elongated form, preferably having end development, by evaporating a solution in presence of a small proportion of a metallic salt conducive to the formation of such crystals, preferably an iron salt, and a small proportion of free acid. These and other aspects of the invention are defined in the appended claims.

The preferred method of producing sulphate of ammonia showing little or no tendency to cake on standing, according to the present invention, consists in bringing about a reaction between calcium sulphate and an aqueous medium containing ammonium ions and carbonic acid ions and then causing sulphate of ammonia to crystallize from the aqueous medium in presence of a small quantity of a metallic salt conducive to the formation of crystals of elongated form, preferably having end development, and a small quantity of free acid, so as to produce robust crystals having in bulk a high percentage of voids. The reaction may be effected by bringing ammonia and carbon dioxide into contact with calcium sulphate in an aqueous medium. The insoluble material, consisting mainly of calcium carbonate can be separated by filtration or other known means before crystallization. The invention is more particularly defined in the appended claims.

The type of crystal which is required to give the high percentage of voids in bulk is a robust hexagonal prism preferably having end development, i. e. chisel shaped or, better, pointed ends and a ratio of length to diameter of about 4 or more and preferably 8 or 10 to 1. Such crystals which are roughly of "zeppelin" shape give in bulk about 50 to 60% of voids.

Crystalline sulphate of ammonium produced by evaporation of solutions of the salt such as are obtained in the manufacture of sulphate of ammonia by double decomposition of ammonia, carbon dioxide and calcium sulphate, or by other known means, usually has about 45 per cent of voids in the mass, the crystals themselves having a ratio of length to diameter of about 1 or 2 to 1. Minor modifications take place when free acid is present but even up to 5% free acid the general dimensions are the same. When the rate of cooling is increased the crystals become flatter in cross section and very rapid cooling produces long flat needles with square ends. These have a high percentage of voids in bulk (50–60%) but are readily broken into small pieces and differ greatly from the robust hexagonal crystals it is desired to produce.

We have not found it possible to produce robust elongated crystals of the desired form by using all metallic salts but our investigations have shown that salts of the following metals are conducive to the production of elongated crystals having pointed ends:— Iron (ferric), chromium, aluminium, titanium, beryllium, zirconium, yttrium. Chromates and dichromates are also effective.

The addition of 0.1% of thorium sulphate produced crystals having square chisel ends and a length: diameter ratio of 4.5 to 5.5:1 and 56.7% voids in bulk.

It must be borne in mind that the effects observed for any given compound will be modified to a greater or less extent according to the degree of acidity of the solution and the presence of other substances in solution.

Thus the presence in the solution of substance affecting the chemical composition or state of oxidation of the added metallic salt may have an influence upon the form of crystal produced. It is believed that when using ammonium chromate the form of crystal is to be attributed to the presence of ammonium dichromate formed by the action of the free sulphuric acid.

The addition of ferrous sulphate to a solution of sulphate of ammonia produced a very definite effect on the form of crystals produced. Short hexagonal crystals were obtained in presence of 0.02% by weight of free sulphuric acid and at a higher acidity of 0.75% by weight of free sulphuric excellent crystals of a satisfactory length to diameter ratio were produced having 57% of voids in bulk. Closer investigation has indicated that this result is to be attributed to oxidation of a part of the ferrous salt to the ferric salt and that in complete absence of ferric salt little or no elongation is produced.

The presence of a small proportion of nitric acid in the solution or in the added sulphuric acid may effect the desired oxidation to the ferric state.

Investigations on the addition of ferric salt have shown that pointed crystals are not formed when the solution is alkaline with ammonia or neutral (as indicated by methyl red). The necessary acidity appears, however, to be very low since long pointed crystals are formed when 0.06% by weight of free sulfuric acid is present in solution. Similar crystals are produced at acidities up to 10% of free sulphuric acid, modification chiefly in respect of size becoming noticeable as the concentration of acid increases. Modification in size and in length to diameter ratio of pointed crystals formed at a given rate appears to be caused by alternation both of the degree of acidity and of the amount of iron salt added. These addends must therefore be considered in relation to each other.

When employing the saturator process the manner of absorbing the ammonia and of removing the crystals may follow the usual practice provided care is taken to keep the rate of supply of ammonia and the temperature of crystallization within narrow limits. From the foregoing it will be seen that it is necessary to maintain a definite slight acidity in the saturator. This can be maintained by adequate agitation and correct adjustment of the supply of fresh sulphuric acid.

It must be noted that to obtain a strict comparison between the results obtained on modifying the nature and amount of the added substances, crystallization must be carried out at a definite rate. The rate of crystallization has an observable effect on the size and shape of the crystals.

The size of the individual crystals is not of primary importance in producing a product showing in bulk a high proportion of voids although it is necessary that the size should be as uniform as possible. An undue proportion of finer crystals between the interstices or larger crystals will reduce the percentage of voids. Large crystals are, however, preferable.

The rate of crystallization must be carefully controlled to obtain the best results. The crystallization should be effected at a limited uniform rate by controlling the supply of sulphuric acid and of gaseous ammonia to maintain the supply as uniform as possible.

The gaseous ammonia absorbed may be a product of destructive distillation e. g. from coke ovens or coal gas retorts, obtained by the direct or semi-direct or indirect methods; or synthetic ammonia, pure or diluted with other gases may be employed.

When crystallizing solutions of sulphate of ammonia the rate of crystallization should also be effected at a limited uniform rate either by cooling the solution or by evaporation at constant temperature or by a combination of these. It has been found that crystals of the desired form—robust hexagonal needles—can be produced by cooling an agitated solution from any temperature provided the rate of cooling is not too high. The rate of cooling should preferably not exceed about 0.42° C. per minute, as otherwise the crystals may become flatter and lose their end development. When the rate of cooling is very rapid, flat crystals which are practically rectangular plates are produced as has already been stated.

The minimum amount of added metallic salt necessary to produce pointed elongated hexagonal crystals of robust form appears to be very small. With 0.003% of iron (ferric) or 0.05% of aluminium or 0.01% of chromium, calculated by weight on the sulphate of ammonia present, good crystals have been obtained. Generally speaking less than about 1% of metallic salt, calculated as metal upon the sulphate of ammonia present, may be employed. This may be introduced as a salt or in the form adapted to react with the constituents of the solution to give the desired salt. It is to be understood that when percentages of metallic salt are referred to herein, the figure is calculated as metal upon the sulphate of ammonia present, by weight.

An iron salt is preferably employed and this may be provided in the crude sulphuric acid employed, e. g. in the saturator, the amount thereof being adjusted if necessary, or the iron may be added to the solution in the form of a salt or as the metal itself which may be dissolved slowly by the solution. The invention is not limited by the manner or form in which the metallic salt is introduced.

The nature of the added salt may be altered by other bodies already present in the solution, or by subsequent addition of other bodies. For example, the state of oxidation of an added salt may be varied as required by suitable addition of other substances. Thus an oxidizing agent may be present to convert a proportion of ferrous salt to ferric salt or alternatively a reducing agent may be present if it is desired to reduce a proportion of a ferric salt to the ferrous salt. This forms a convenient way of adjusting the proportion of ferric salt in solution so as to secure the presence of the optimum proportion in solution.

There appears to be an upper limit to the quantity of added metallic salt which will give the most satisfactory form of crystal. The effect of too much added salt may be either to produce a very fine crystalline powder, the individual crystals being of the correct shape, or to produce pointed hexagonal crystals of very great length to diameter ratio which are in consequence somewhat fragile and tend to break up. It is necessary that the crystals be sufficiently robust to resist fracture on ordinary handling as otherwise the proportion of intercrystalline voids may be undesirably reduced.

A convenient proportion of free acid to employ in the solution to be crystallized is up to 1% by weight of sulphuric acid but when operating by the saturator process it is desirable to maintain about 5% of free acid. Sufficient must be present to keep the added metallic salt in solution. It is to be understood that when percentages of free acid are referred to herein, the figure is calculated as pure sulphuric acid upon the total solution, by weight.

The effect of added salts is of great scientific interest, and in the case of iron sulphate, it has been shown that this salt enters into the composition of the elongated ammonium sulphate crystal in very small amounts, but is not uniformly distributed throughout the crystal. The quantity of iron found in these crystals may be very small e. g. of the order of 0.02 per cent.

It is believed that the crystal structure of ammonium sulphate allows certain other elements to become attached in such a way as to encourage the rate of growth of the crystal in certain directions, possible by virtue of the case of formation of well defined crystalline double salts of ammonium sulphate and the salts of these elements. Whatever may be the mechanism of the process, however, the presence of small proportions of metallic salts in conjunction with the maintenance of free acidity in the saturator as hereinbefore described enables elongated pointed crystals to be obtained which show a high percentage of voids in bulk and reduce materially the tendency of the product to cake.

In the accompanying drawing:—

Figure 1 shows a cross section and side elevation of the end of a crystal of the preferred type. End development to a point is clearly shown.

Figure 2 shows a cross section and side elevation of the end of a crystal produced by more rapid cooling of a solution. A chisel type of end development is shown and the crystal is flatter. This is a less desirable form but shows a high percentage of voids in bulk, if the length to diameter ratio is sufficiently high, and is fairly robust.

Figures 1 to 3 are of course diagrammatic. Accurate measurements appear to show definite but very slight irregularities in the cross-sectional shape.

Figure 1:
Figure 1:
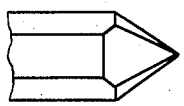
Figure 2:
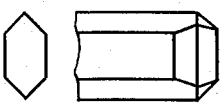
Figure 3:
Figure 3 shows a cross section and side elevation of the end of a crystal produced by still more rapid cooling which is practically a flat rectangular plate and shows caking when in bulk.
Figure 4:
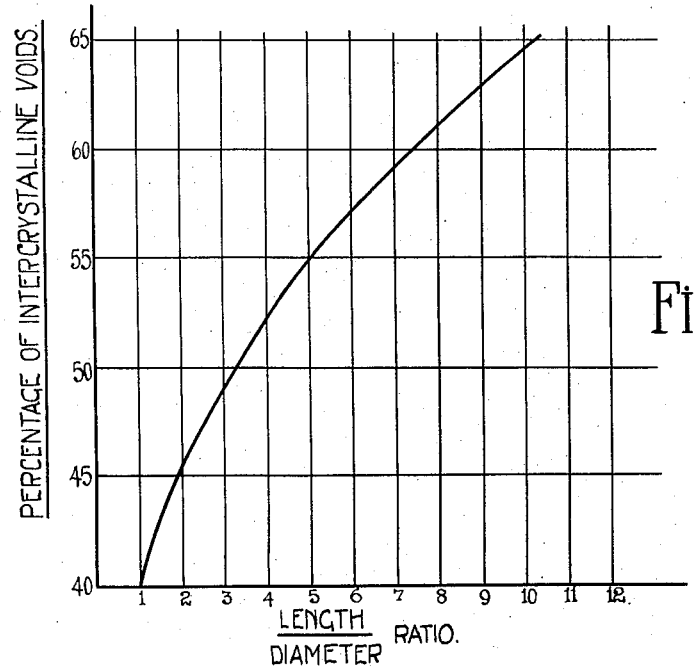
Figure 4 is a graph showing the connection between the length to diameter ratio and percentage of intercrystalline voids in sulphate of ammonia prepared by slow cooling of saturated solutions. The material was substantially uniform in size and had little or no fine material or "dust" within the voids.
Figure 5:
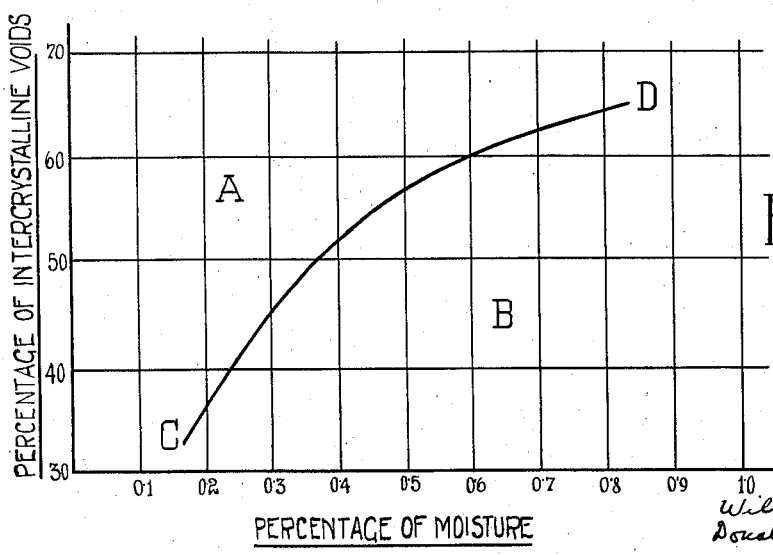

Figure 5 is a graph showing the relationship between the percentage of intercrystalline voids in the mass of crystals of sulphate of ammonia and the percentage of water when may be present before the mass will exhibit caking. This percentage may be referred to as the "maximum water content." When the conditions lie within the area A, that is above the line C D, the crystals of sulphate of ammonia will not cake and with conditions coming within the area B, the product will cake, the line C D representing the points at which caking actually occurred. It will be seen that with a higher percentage of voids a higher percentage of water may be present before caking will occur, i. e. with a high percentage of voids the maximum permissible water content is high. In practice the water may be present or may not; but if present it will not bring about caking until the percentage indicated by the curve has been exceeded. Thus with say, 60% of voids the proportion of moisture may vary between 0 and approximately 0.6% without caking taking place.

A high maximum permissible water content means that a relatively wide range within which the water content may be permitted to vary without caking taking place and this therefore is a factor of the highest importance where the conditions of storage or transport of the sulphate of ammonia are such that water may be taken up or lost or alternately taken up and lost by the salt. Even with 50% of voids it will be seen that the maximum permissible water content exceeds 0.35% while with 55% voids it exceeds 0.45%. The relatively non-caking character of our product is to be attributed ultimately to this high maximum permissible water content.

*Example 1*

An aqueous solution resulting from the reaction between ammonia, carbon dioxide and calcium sulphate was evaporated after filtration until it contained, at a temperature of 45° C., about 45% by weight $(NH_4)_2SO_4$. Sulphuric acid was then added to give 0.2% free $H_2SO_4$ in the solution, and with it, ferric sulphate to the extent of 0.003% Fe on the amount of $(NH_4)_2SO_4$ present in solution. The solution was then cooled to 23° C., the rate of cooling at the crystallizing point (40.8° C.) being 0.2° C. per minute. The crystals of $(NH_4)_2SO_4$ were separated, centrifuged and dried in the normal manner. The resulting product was substantially non-caking, the individual crystals being of an average length of 2.2 mm. and showing an average length to diameter ratio of 9:1. The product in bulk showed 62% voids.

More desirably, however, the crystallization may be carried out by boiling the solution at constant temperature at a controlled rate of crystallization. It is known that slow evaporation of boiling solutions e. g. under reduced pressure is conducive to the formation of large crystals. By carrying out the evaporation in presence of an added iron salt and free acid as described above crystals of the desired form can be obtained. If desired a part or the whole of the free acidity may be developed during the boiling.

*Example 2*

Into a saturator containing 450–550 gallons of mother liquor of 60° Tw. (at 100° C.) having an acidity of 5% $H_2SO_4$, and containing 0.003% ferric iron, maintained at a temperature of 110° C. within 2° C. in either direction, gases containing ammonia were introduced at the rate of 2,800–3000 cu. ft. (at 100° C.) per minute. Fresh sulphuric acid of 125–135° Tw. and containing 0.04% ferric iron was continuously introduced at the rate of approximately 2 gallons per minute, and the sulphate of ammonia continuously removed. After centrifuging, washing and drying, the product was substantially non-caking, and was composed of crystals of an average length to diameter ratio of 8:1 and showing an average length of 1.8 mm. The product in bulk showed 51% voids.

We declare that what we claim is:—

1. The method of producing sulphate of ammonia showing little or no tendency to cake on standing which consists in forming sulphate of ammonia in a body of solvent which contains a small proportion of a metallic salt conducive to the formation of robust elongated crystals and a small proportion of free acid and is maintained at constant temperature adjacent to the boiling point so as to cause separation of sulphate of ammonia in a form showing a high proportion of intercrystalline voids in bulk.

2. The method of producing sulphate of ammonia showing little or no tendency to cake on standing which consists in passing ammoniacal gas into sulphuric acid containing a small proportion of metallic salt conducive to the formation of crystals of elongated form, maintaining said small porportion of said metallic salt in the solution, maintaining a small proportion of free acid in the solution, and separating the crystals of sulphate of ammonia while maintaining said solution at a constant temperature adjacent the boiling point.

3. The method of producing sulphate of ammonia showing little or no tendency to cake on standing as claimed in claim 2 in which the sulphuric acid is replenished and the ammoniacal gas passed in, at a uniform rate.

4. The method of producing sulphate of ammonia showing little or no tendency to cake on standing which consists in subjecting to substantially uniform evaporation at constant temperature a solution containing sulphate of ammonia, a proportion of free acid not more than 5% and a proportion of metallic salt conducive to the formation of robust elongated crystals less than 1%, whereby the crystals of sulphate of ammonia which separate show in bulk a high proportion of intercrystalline voids.

5. The method as claimed in claim 4 in which the evaporation is conducted by boiling the solution under reduced pressure.

6. The method as claimed in claim 4 in which the metallic salt is a ferric salt.

7. In the production of sulphate of ammonia, causing crystals of sulphate of ammonia to separate at a substantially uniform rate from a solution thereof which contains a proportion of free acid not more than 5% and a proportion of metallic salt conducive to the formation of robust elongated crystals less than 1% whereby such crystals show in bulk a high proportion of intercrystalline voids and therefore show little or no tendency to cake on standing.

8. In the production of sulphate of ammonia causing crystals of sulphate of ammonia to separate at a substantially uniform rate from a solution thereof which contains a proportion of free acid not more than 5% and a proportion of a ferric salt less than 1% but sufficient to conduce to the formation of robust elongated crystals whereby such crystals show in bulk a high proportion of intercrystalline voids and therefore show little or no tendency to cake on standing.

9. In the production of sulphate of ammonia from a solution thereof containing ferrous salt, adding sufficient quantity of an oxidizing agent to produce a proportion of ferric salt in solution less than 1% but sufficient to conduce to the formation of robust elongated crystals and maintaining a proportion of free acid not more than 5% while causing crystals of sulphate of ammonia to separate at a substantially uniform rate from said solution whereby such crystals show in bulk a high proportion of intercrystalline voids and therefore show little or no tendency to cake on standing.

10. In the production of sulphate of ammonia from a solution thereof containing a ferric salt in excess of 1%, adding sufficient quantity of a reducing agent to reduce the proportion of ferric salt in solution to less than 1% but sufficient to conduce to the formation of robust elongated crystals and maintaining a proportion of free acid not more than 5% while causing crystals of sulphate of ammonia to separate out at a substantially uniform rate from said solution whereby such crystals show in bulk a high proportion of intercrystalline voids and therefore show little or no tendency to cake on standing.

11. The method as claimed in claim 2 in which the metallic salt is a ferric salt.

12. The method as claimed in claim 2 in which the proportion of metallic salt is less than 1%.

13. The method as claimed in claim 2 in which the proportion of free acid does not exceed 5%.

14. The method of producing sulphate of ammonia showing little or no tendency to cake on standing which consists in passing ammoniacal gas into sulphuric acid containing less than 1% of a ferric salt, maintaining said ferric salt in solution in substantially the same proportion, maintaining a proportion of free acid not more than 5% and separating the crystals of sulphate of ammonia while maintaining said solution at a constant temperature adjacent the boiling point.

15. The method as claimed in claim 14 in which said sulphuric acid is replenished and said ammoniacal gas passed in at a uniform rate.

16. The method of producing sulphate of ammonia showing little or no tendency to cake on standing which consists in causing a solution containing sulphate of ammonia, a proportion of free acid not more than 5% and a proportion of metallic salt conducive to the formation of robust elongated crystals less than 1%, to deposit crystals of sulphate of ammonia, at a constant temperature and at a substantially uniform rate whereby such crystals show in bulk a high proportion of intercrystalline voids.

17. The method of producing sulphate of ammonia showing little or no tendency to cake on standing which consists in forming sulphate of ammonia in a body of solvent containing a proportion of free acid not more than 5% and a proportion of metallic salt conducive to the formation of robust elongated crystals less than 1% and causing crystals of formed sulphate of ammonia to separate from said solution at a substantially uniform rate whereby said crystals show in bulk a high proportion of intercrystalline voids.

18. The method as claimed in claim 17 in which said solution is maintained at a constant temperature adjacent the boiling point during separation of said crystals therefrom.

19. The method as claimed in claim 16 in which the metallic salt is a ferric salt.

20. The method as claimed in claim 17 in which the metallic salt is a ferric salt.

21. As a new article of manufacture sulphate of ammonia in the form of robust, pointed hexagonal needles having a length to diameter ratio of at least 8 to 1 and sufficient uniformity of size to exhibit a high proportion of intercrystalline voids in bulk.

22. As a new article of manufacture, sulphate of ammonia in the form of robust pointed hexagonal needles having a length to diameter ratio between 4 and 10 to 1 and exhibiting at least 50% of intercrystalline voids in bulk.

23. As a new article of manufacture, sulphate of ammonia in the form of robust pointed hexagonal needles having a length to diameter ratio between 4 and 10 to 1 and sufficient uniformity of size to exhibit a high proportion of intercrystalline voids in bulk.

24. As a new article of manufacture, non-caking sulphate of ammonia having a permissible moisture content exceeding 0.35%.

25. As a new article of manufacture, non-caking sulphate of ammonia having a permissible moisture content exceeding 0.45%.

In witness whereof, we have hereunto signed our names this 27th day of February 1930.

WILLIAM GORDON ADAM.
DONALD GEORGE MURDOCH.